Dec. 30, 1969   E. C. SEWARD   3,486,652
TRUCK BODY AND CONTAINER LIFTING DEVICE
Filed May 14, 1968   4 Sheets-Sheet 1
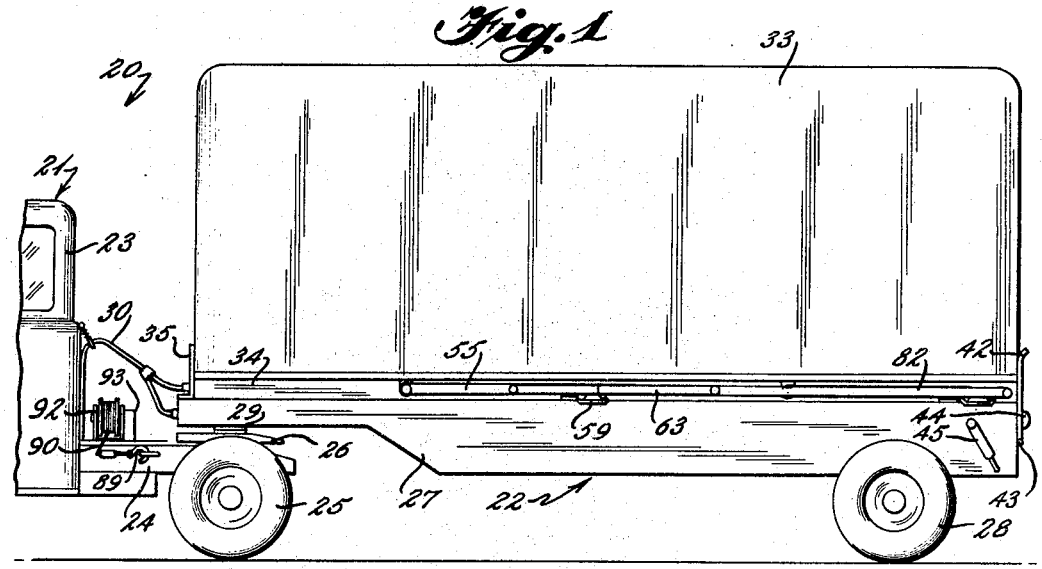
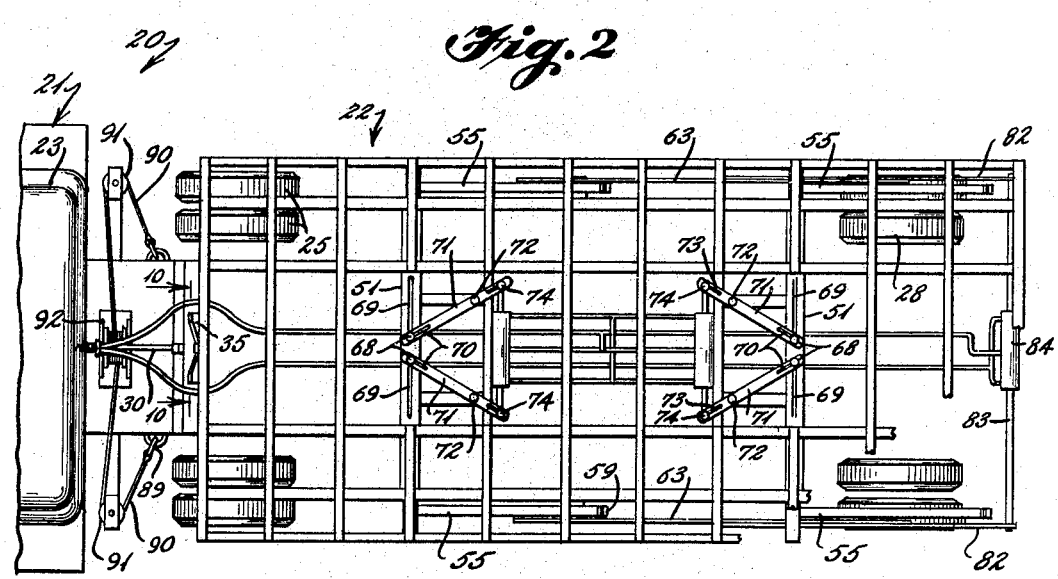
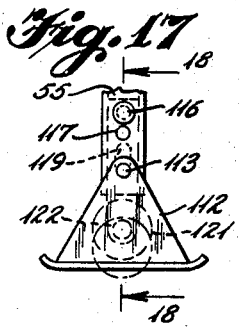
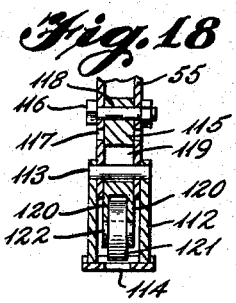
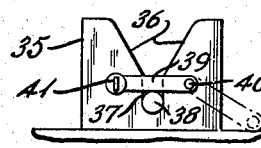
INVENTOR
Edgar C. Seward
BY
ATTORNEYS

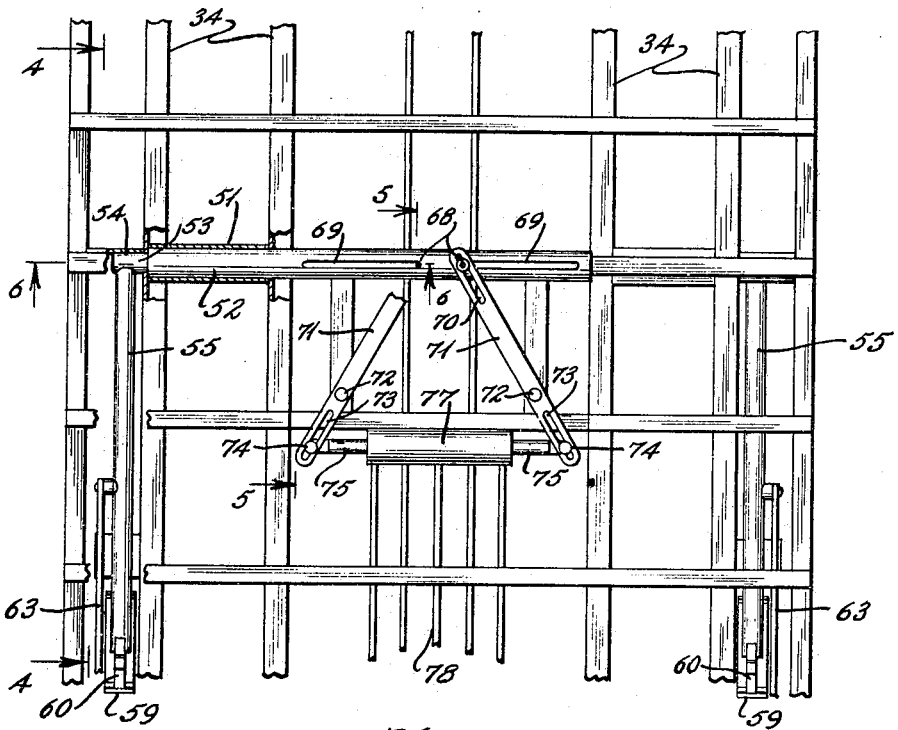
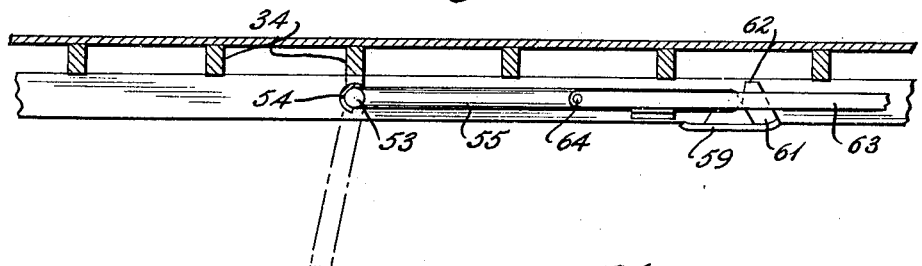
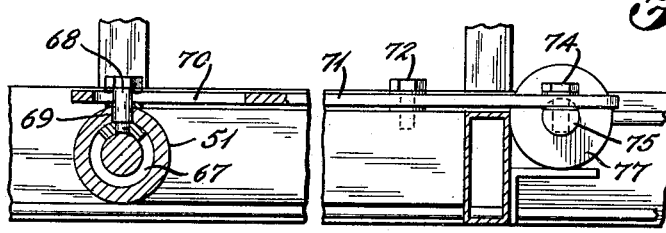

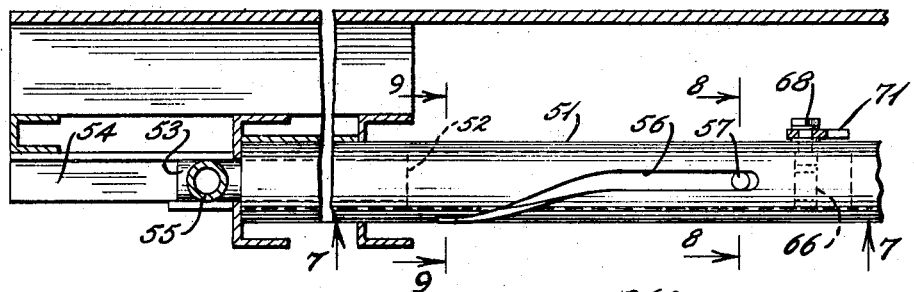

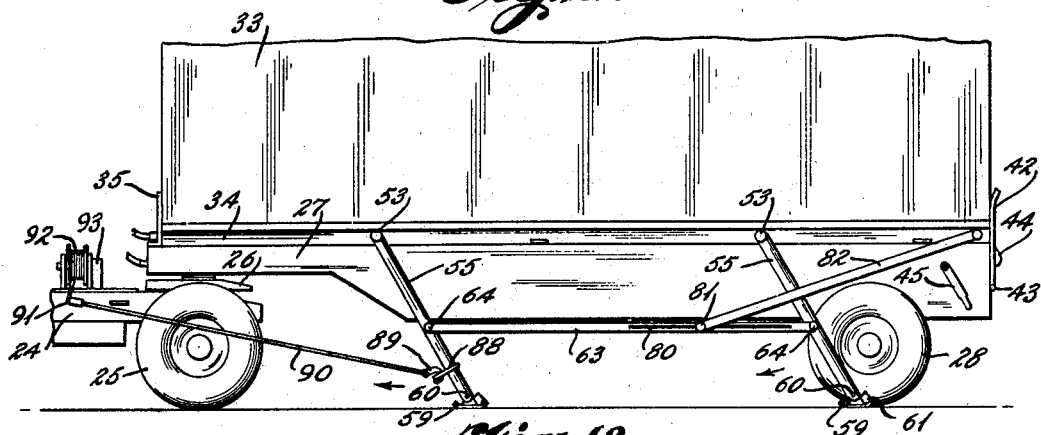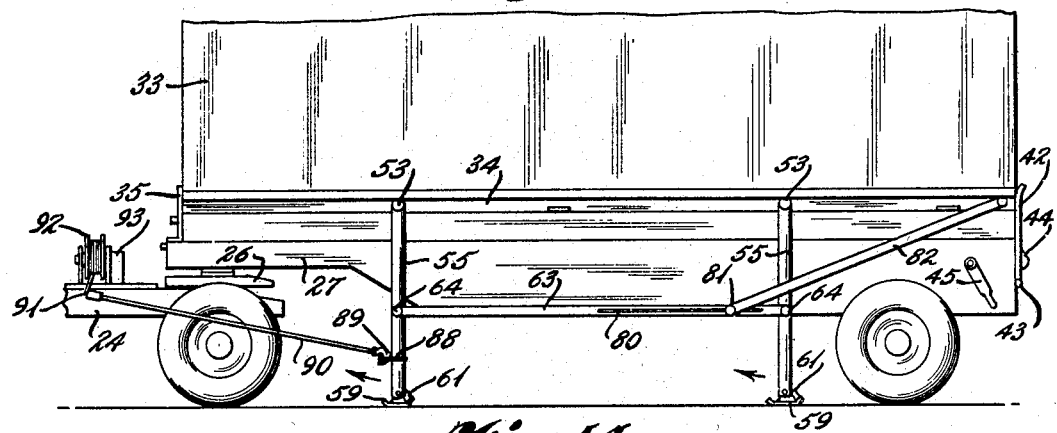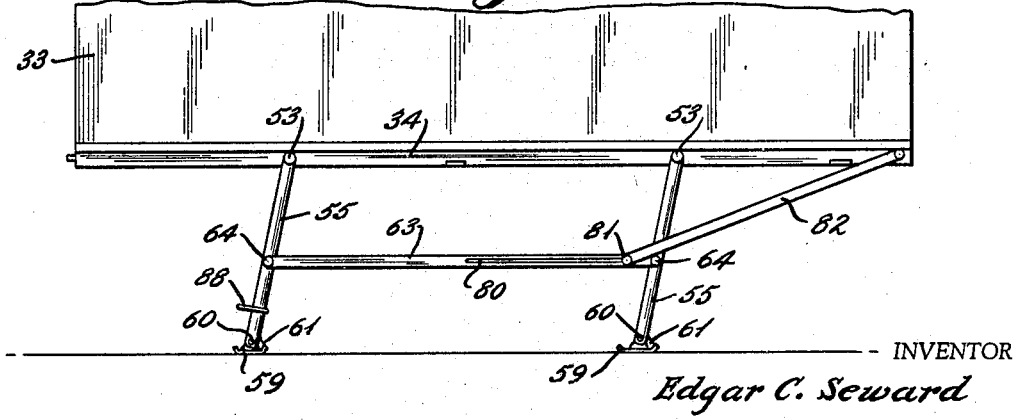

United States Patent Office 3,486,652
Patented Dec. 30, 1969

3,486,652
TRUCK BODY AND CONTAINER LIFTING DEVICE
Edgar C. Seward, Arlington, Va.
(6319 Dorset Drive, Alexandria, Va. 22310)
Filed May 14, 1968, Ser. No. 729,037
Int. Cl. B60p 1/64; B66f 3/46
U.S. Cl. 214—515      4 Claims

ABSTRACT OF THE DISCLOSURE

Apparatus capable of being transported on a vehicle chassis and having extendable legs which can be lowered into engagement with the ground so that further movement of the chassis will separate the apparatus therefrom.

BACKGROUND OF THE INVENTION

Field of the invention

This invention relates generally to material handling apparatus of various kinds and relates particularly to self-contained apparatus which can be removably mounted on a vehicle bed or the like and transported to a desired location and thereafter raised into self-supporting position by movement of the vehicle.

Description of the prior art

Heretofore, when materials have been shipped by trucks or other vehicles, the truck must remain at the loading or unloading site until all of the material has been loaded or unloaded. In some instances a tractor-trailer combination has been provided so that the trailer could be disconnected from the tractor and left at the site; however, this has necessitated an expensive trailer with all of the running gear attached being left unused at a site for considerable periods of time. Some efforts have been made to provide apparatus which could be carried by a truck and left at an unloading site without leaving a portion of the truck; however, these efforts have not been satisfactory since the structures have been expensive, ungainly, unreliable in operation and for other reasons have not served the purpose for which they were intended.

SUMMARY OF THE INVENTION

The present invention is a device for handling materials which can be removably mounted on a truck bed and moved to a desired location where a plurality of self-contained supporting members can be lowered into engagement with the ground and thereafter continued movement of the truck will cause the device and the materials carried thereby to rest on the supporting members so that the truck can be removed to perform other work. The self-contained supporting members include a plurality of legs which are recessed when not in use but which can be extended to a position outwardly of the truck and lowered into engagement with the ground when they are to be used.

It is an object of the invention to provide an apparatus which can be removably mounted on the chassis of a transporting vehicle and such apparatus includes a plurality of self-contained supporting members that can be activated from a remote location and moved into engagement with the ground so that continued movement of the vehicle will remove the apparatus from such vehicle.

BRIEF DESCRIPTION OF THE DRAWINGS

FIG. 1 is a side elevation illustrating one application of the device mounted on a vehicle.

FIG. 2 is a top plan view of the bed of the removable trailer housing.

FIG. 3 is an enlarged fragmentary top plan view similar to FIG. 2 with portions broken away for clarity.

FIG. 4 is a section on the line 4—4 of FIG. 3.

FIG. 5 is an enlarged fragmentary section on the line 5—5 of FIG. 3.

FIG. 6 is an enlarged fragmentary section on the line 6—6 of FIG. 3.

FIG. 7 is a section on the line 7—7 of FIG. 6.

FIG. 8 is a section on the line 8—8 of FIG. 6.

FIG. 9 is a section on the line 9—9 of FIG. 6.

FIG. 10 is an enlarged detail section on the line 10—10 of FIG. 1.

FIG. 11 is a schematic of the hydraulic system for extending and retracting the legs of the apparatus.

FIG. 12 is a fragmentary side elevation illustrating the legs in lowered position and with the body of the trailer resting on the chassis.

FIG. 13 is a side elevation similar to FIG. 12 illustrating the legs in upright position and the body raised out of contact with the chassis.

FIG. 14 is a side elevation similar to FIG. 12 illustrating the legs in final supporting position with the chassis of the truck removed.

FIG. 15 is a modified form of the invention with adjustable legs.

FIG. 16 is a schematic layout of the operating system of FIG. 15.

FIG. 17 is an enlarged fragmentary side elevation of a further modified form of the invention, and FIG. 18 is a section on the line 18—18 of FIG. 17.

DESCRIPTION OF THE PREFERRED EMBODIMENTS

With further reference to the drawings a vehicle 20 is provided including a tractor 21 and a trailer 22. The tractor includes a cab 23 mounted on a frame 24 supported by ground-engaging wheels 25 and such frame may include a fifth wheel 26 by which the trailer is connected to the tractor. The trailer 22 includes a frame 27 supported by ground-engaging wheels 28 at one end and at the opposite end by a connection 29 which cooperatively engages the fifth wheel 26. Preferably flexible fluid lines 30 connect a source of fluid under pressure (not shown) on the tractor 21 with the trailer 22. The structure thus far described is conventional in the prior art and form no part of the present inventive concept.

A container or body 33 having a bed 34 is removably mounted on the trailer 22 in such a manner that the vehicle can transport the container to a predetermined location after which the container can be removed to facilitate loading and unloading of the contents while the vehicle is free to do other work including the transporting of other containers.

To maintain the container 33 in fixed position on the trailer 22, one or more stop members 35 are fixed on the forward portion of the frame 27, and each member includes a pair of opposed tapered portions 36 which terminate in a groove or slot 37. A pin member 38 carried by the container 33 is adapted to be guided by the tapered portions 36 into the slot 37 to center the container 33 on the trailer 22. After the pin member 38 is in position within the slot 37, it may be locked in any desired manner, as by an arm 39 (FIG. 10) mounted at one end by a pivot 40 and selectively secured at the opposite end by a removable pin 41. A gate 42 is pivotally mounted by a hinge 43 on the rear portion of such frame. The gate 42 is adapted to be selectively locked in raised position in any desired manner, as by a hook 44 operated by a lever 45 mounted on the side of the frame 27. When the gate 42 is in raised position, it will prevent rearward movement of the container 33.

In order to remove the container 33 from the trailer frame 27, the bed 34 is provided with a pair of longitudinally spaced transversely extending tubular members 51 each of which slidably receives a pair of opposed rods 52 having reduced end portions 53 receivable within tubular members 54. A post or leg 55 is fixed to the outer end of each of the end portions 53. The rods 52 are adapted to be extended and retracted and when the rods are being extended the legs 55 will be rotated from a generally horizontal position, as illustrated in FIG. 1, to a generally vertical position, as illustrated in FIG. 12 by a helical slot 56 in the tubular members 51 which are slidably engaged by pins 57 carried by the rods 52. The outer end of the slot 56 has an enlargement or bayonet portion 58 for a purpose to be described later. The free end of each of the legs 55 has a shoe 59 pivotally mounted thereon in any desired manner, as by a pin 60. If desired the shoe 59 may have an upstanding lug or support brace 61 with an edge 62 disposed at an angle generally corresponding to the angle of the leg when the leg is in final supporting position. Preferably a connecting link 63 is connected by pins 64 to the legs 55 on each side of the trailer to make certain that the legs move in unison.

Means is provided for extending and retracting the rods 52 and such means include a reduced annular groove 66 located adjacent the inner end of each of the rods 52. Such groove is adapted to slidably receive a yoke 67 having an upstanding pin 68 projecting outwardly through slots 69 in the tubular members 51. Each of the pins 68 is received within a slot 70 located in one end of a lever 71 which is pivotally mounted intermediate its ends on a pivot pin 72. The opposite end of each of the levers 71 is provided with a slot 73 in which is received a pin 74 carried by a piston rod 75. The opposite end of each piston rod is connected to a piston 76 slidably mounted within a fluid cylinder 77. Each cylinder receives a pair of pistons 76 and is provided with a fluid line 78 connected centrally of the cylinder to move the pistons outwardly and a header connecting a fluid line 79 to opposite ends of such cylinder to move the pistons toward each other. When fluid under pressure is introduced into the cylinder 77 through the fluid line 79, the pistons 76 will be moved toward each other and will pivot the levers 71 about the pin 72 and thereby extend the rods 52 so that such rods will move the legs 55 from a generally horizontal position adjacent to the bed 34 to a generally vertical position. When fluid under pressure is introduced into the cylinder 77 through the fluid line 78, the pistons 76 will be moved away from each other and will cause the rods 52 to be retracted.

Although the mechanism for extending and retracting the legs has been described and illustrated as a double cylinder, it is contemplated that an independent cylinder could be used for each lever 71 or that a mechanically operated mechanism such as a scissors type screw jack could be used to extend and retract the rods 52 and legs 55.

In order to support the legs 55 when the container 33 is in raised position, the connecting links 53 at each side of the container are provided with slots 80 which slidably receive a pin 81 carried at one end of an arm 82. The opposite end of the arm 82 is pivotally connected to a piston rod 83 carried by a fluid cylinder 84 mounted on the bed 34. The cylinder 84 is supplied with fluid under pressure through fluid lines 85 and 86 which are connected in series with the fluid lines 78 and 79 so that the arms 82 will be extended and retracted simultaneously with the extending and retracting of the legs 55.

If desired the front legs 55 may have a loop or ring 88 mounted thereon for the reception of a hook 89 carried at the ends of a pair of cables 90. One cable is disposed at each side of the vehicle and extends through fair leads 91 to a winch 92 mounted on the tractor frame 24 and rotated by any desired source of power, such as a motor 93.

With reference to FIGS. 15 and 16 a modified form of the invention is illustrated in which the rods 52 are provided with adjustable legs 100 to compensate for uneven terrain when the container 33 is to be removed from the trailer 22. This is accomplished by mounting a fluid cylinder 101 within each of the legs 100 and providing such cylinder with a piston rod 102 which extends outwardly of the free end of the leg 100. A shoe 59 is pivotally mounted by a pin 60 to the end of the piston rod 102. Fluid under pressure is adapted to be introduced into opposite ends of the fluid cylinder 101 by fluid lines 103 and 104 to extend and retract the piston rod 102.

With particular reference to FIG. 16 it is desirable to operate the fluid cylinders 77 and 101 sequentially so that the legs 100 first are extended and moved to a substantially vertical position by the cylinder 77 after which the cylinder 101 will be operated to extend the piston rod 102. As illustrated, fluid is introduced into the cylinder 77 to retract the pistons 76 and extend the legs 55. When one of the pistons 76 reaches the inner end of its stroke, it will close a switch 105 which will energize a pair of solenoid valves 106 and 107 to divert fluid under pressure from the fluid lines 79 to the fluid lines 103 to extend the piston rod 102. Simultaneously solenoid valve 107 will be operated to permit the return flow of fluid from the cylinder 101 to a fluid resrvoir (not shown). When the piston rod 102 is to be retracted, fluid is introduced into the fluid line 78 which will first introduce fluid into the cylinder 101 to retract the piston rod 102 until a switch 108 is engaged which will activate the solenoid valves 106 and 107 and introduce fluid under pressure into the cylinders 77 to cause the legs 100 to be retracted.

With reference to FIGS. 17 and 18, a modified shoe 112 is pivotally mounted by a pin 113 to the end of the leg 55 and such shoe may have a central opening or slot 114. In this modification a post 115 is slidably received within the leg 55 and is adjustably mounted therein by an anchor pin 116. The lower extremity of the leg 55 is provided with a plurality of spaced pairs of diametrically opposed openings 117. By removing the anchor pin 116 the post 115 may be adjusted lengthwise of the leg 55 so that an opening 118 in such post is in alignment with a predetermined pair of openings 117 in the leg after which the anchor pin 116 can be applied to lock the leg and the post in adjusted position. In order to accommodate the pin 113 which pivotally mounts the shoe 112 on the leg, an elongated slot 119 is provided in the post 115 so that the post can be adjusted while the pin 113 will be fixed.

The lower end of the post 115 is bifurcated to provide a pair of lugs 120 between which a wheel 121 is pivotally mounted by a pin 122. When the post 115 is in its upper position, the wheel 121 will be disposed above the lower portion of the shoe 112, and when the post 115 is extended, such wheel will extend through the slot 114 and will support the weight of the container 33. With this modification the container 33 can be supported in fixed position on the shoes 112 or the wheels 121 can be extended so that such container will be movable.

In the operation of the device the container 33 may be mounted on the frame of the trailer 22 after which the vehicle 20 may be driven to a place of loading or unloading. When the container 33 is substantially in position, the pin 41 is removed and the arm 39 swung to a position indicated by dotted lines in FIG. 10 to free the pin member 38 and thereafter fluid is introduced through the fluid line 78 to cause the rods 52 to be extended and the legs 55 to be pivoted downwardly from a generally horizontal position to a generally vertical position so that the shoes 59 are in engagement with the ground. The hooks 89 then are connected to the loops 88 and the winch 92 is operated while the vehicle is slowly backed up. The friction on the shoes 59 as the container 33 is being pushed by the stop member 35 plus the tension on the cables 90 by the winch 92 will cause the legs 55 to be pivoted to raise the container 33 off of the frame 27 until the pin 81 in the arm 82 reaches the end of the slot 80 in the link 53. During this movement the pins 57 will enter the bayonet portion 58 and preferably will reach the end thereof simultaneously with pins 81 reaching the end of the slots 80. In this position the gate 42 is released, the hooks 89 are removed from the loops 88 and the fluid lines 30 are disconnected from the container 33. At this point the container 33 is entirely supported on the legs 55 so that the vehicle 20 can be driven away and the container 33 can be either loaded or unloaded.

When it is desired to replace the container 33 on the trailer 22 the vehicle 20 is positioned beneath the container, the hooks 89 are connected to the loops 88, and the gate 42 is raised to a position behind the container 33. The vehicle then is driven forward slowly while the winch 92 unreels the cables 90. During the initial movement the gate 42 will push the container 33 until such container passes top dead center of the legs 55 after which the strain will be transferred to the cables 90 and the container will be lowered to the frame 27 and guided by the stop members 35 and the gate 42. After the full weight of the body is on the frame 27, fluid cylinders 77 are operated to fully retract the legs 55.

I claim:

1. Apparatus for supporting a truck body independently of the truck comprising a truck body, a plurality of legs located at each side of said body, each of said legs being connected at one end to a rod slidably mounted in a tubular member, means for extending and retracting said rod and said leg, said tubular member having a helical slot for rotating said leg when said rod is extended and retracted, shoe means swingably mounted on the opposite end of said leg, cable means connectable to certain of said legs, means for operating said cable means, and means on the truck for selectively engaging and guiding said body, whereby said truck will move said body to a predetermined location after which said legs will be extended and rotated from a generally horizontal position to a generally vertical position in a manner that the legs will provide the sole support for said body.

2. The structure of claim 1 in which said means for extending and retracting said rod includes fluid actuated means operable from a remote position.

3. The structure of claim 1 in which said shoe means is adjustably mounted on each leg.

4. Apparatus for supporting a truck body independently of the truck comprising a truck body, a plurality of legs located at each side of said body, each of said legs being connected at one end to a rod slidably mounted in a tubular member, fluid actuated means carried by said body, linkage means connecting said fluid actuated means to each rod adjacent to the other end for extending and retracting said rod and said leg, said tubular member having a helical slot terminating in a bayonet portion located adjacent to the outer end of said tubular member, said rod having pin means extending through said helical slot for rotating said leg when said rod is extended and retracted, said pin means being receivable within said bayonet portion to lock said leg in extended position and to prevent further rotation of said leg, shoe means swingably mounted on the opposite end of said leg, and means on said truck for selectively engaging and guiding said body, whereby said truck will move said body to a predetermined location after which said legs will be extended and rotated from a generally horizontal position to a generally vertical position in a manner that the legs will provide the sole support for said body.

References Cited
UNITED STATES PATENTS

| | | | |
|---|---|---|---|
| 3,063,667 | 11/1962 | Doty et al. | |
| 3,332,661 | 7/1967 | Hand | 214—515 X |
| 3,430,793 | 3/1969 | Chapman | 214—515 |

ALBERT J. MAKAY, Primary Examiner

U.S. Cl. X.R.

254—45